Jan. 18, 1949.                        A. SVOBODA                        2,459,726
                                 COMPUTING LINKAGE
Filed Jan. 15, 1946                                              2 Sheets—Sheet 1

INVENTOR
ANTONIN SVOBODA

Jan. 18, 1949.  A. SVOBODA  2,459,726
COMPUTING LINKAGE
Filed Jan. 15, 1946  2 Sheets-Sheet 2

INVENTOR
ANTONIN SVOBODA

BY

ATTORNEY

Patented Jan. 18, 1949

2,459,726

UNITED STATES PATENT OFFICE 2,459,726

COMPUTING LINKAGE

Antonin Svoboda, Cambridge, Mass., assignor, by mesne assignments, to the United States of America as represented by the Secretary of the Navy Application January 15, 1946, Serial No. 641,345

2 Claims. (Cl. 235—61.5)

This invention relates to a mechanical computer for performing dividing computations and more particularly to a mechanical divider in which the quotient determined is positive in character.

For general information purposes in connection with the present invention, reference is made to the textbook, Computing Mechanisms and Linkages, vol. 27, by Antonin Svoboda, Massachusetts Institute of Technology, Radiation Laboratory Series, First Edition 1948, McGraw-Hill Book Company, Inc.

An object of this invention is to provide a mechanical computer and more particularly to provide such a computer for performing dividing computations.

A particular object of this invention is to provide a mechanical computer for solving the equation $$Y = \frac{1}{(1+.0402X)^2}$$

Figure 1:
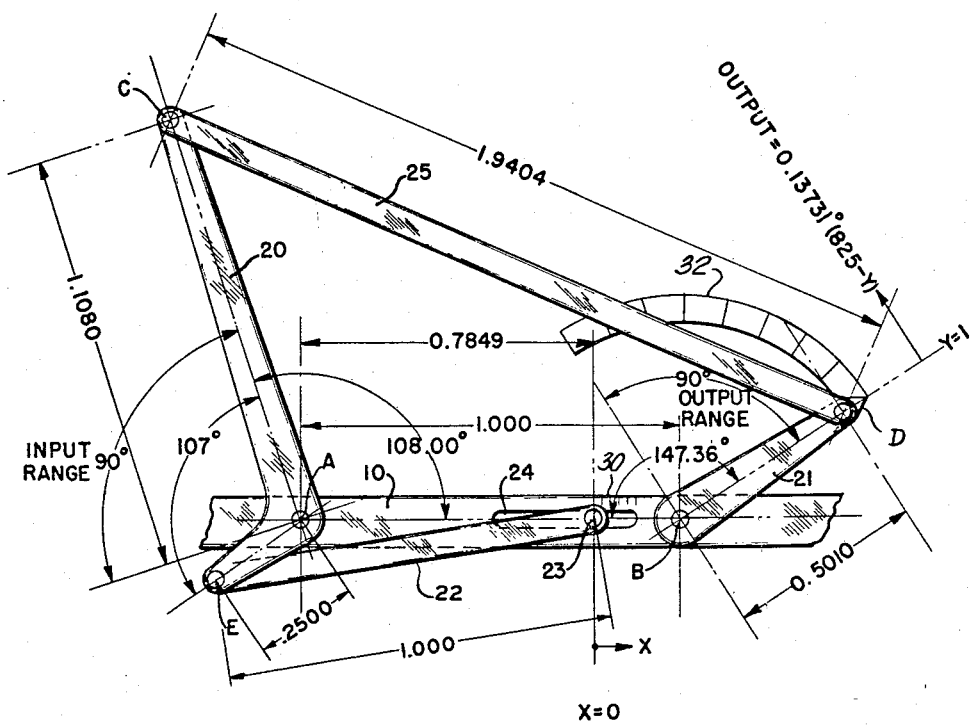
Figure 2:
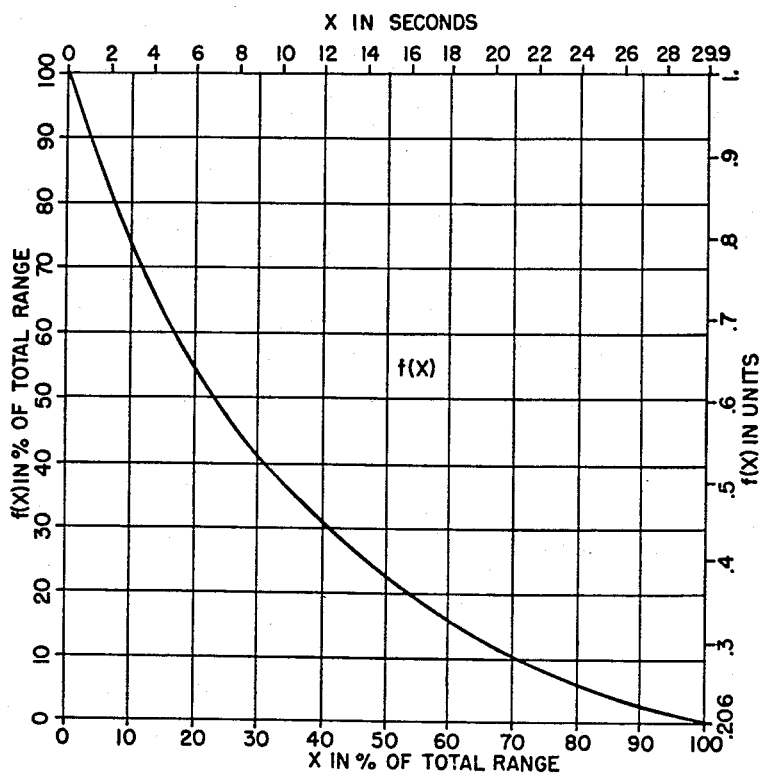

Further objects and advantages of this invention, as well as its construction, arrangement, and operation, will be apparent from the following description and claims in connection with the accompanying drawing, in which, Figure 1 is an assembly drawing of a computer constructed in accordance with the principles of this invention;

Fig. 2 is a curve of the equation $$Y = \frac{1}{(1+0.402X)^2}$$

over the range of operation of the linkage of the present invention; and

Figure 3:
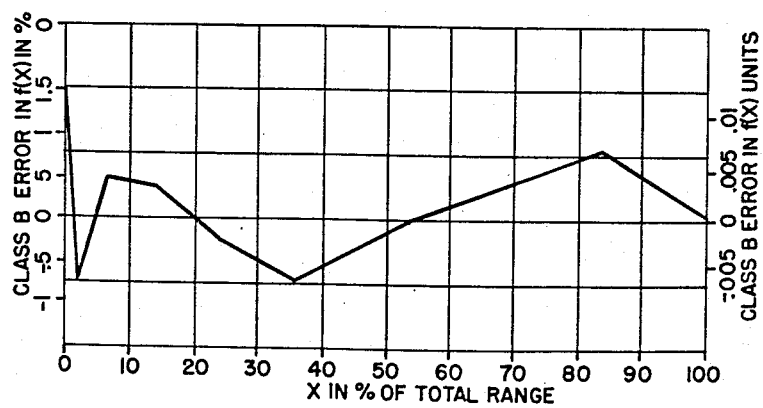

Fig. 3 is a curve of the theoretical precision of the computer of the present invention over its range of operation.

As stated, the purpose of this invention is to provide a mechanical computer for solving the equation $$Y = \frac{1}{(1+0.402X)^2}$$

where X is the displacement of one of the members of the computer from its zero position. A mechanism embodying my invention consists of a linkage system having such relative dimensions that displacement of the output angle thereof is proportional to Y where $$Y = \frac{1}{(1+.0402X)^2}$$

where X is the displacement of the input section of the device from its zero position. The curve of Fig. 2 is a plot of this function over the portion thereof defined by a range of values of X between zero and 29.9. The ordinates of the curve are expressed both in terms of seconds and percent of range of operation, and the abscissa are expressed in terms of $f(X)_1$ (i. e., Y) measured in both percent of range of operation and in units. The curve of the function is regular in form over the operating range and thus lends itself to mechanization.

Referring to Fig. 1 there is shown a support 10 having curved and straight swinging members 20 and 21 pivoted to support 10 at points A and B, respectively.

A link 22 operatively connects point E of member 20 to a slide pin 23 which is slidably mounted in a slot 24 provided in support 10. A scale 30, uniformly calibrated in positive values of X from X=0 is affixed adjacent the slideway 24 to indicate input values of X into the mechanism. The free ends of members 20 and 21 are joined in a pivotal manner by means of a link 25 at points C and D respectively. It is to be understood that all of the connections referred to are pivot connections so as to allow relative movement between the various connected members, unless it is expressly indicated that the connections are rigid in character.

The relative dimensions of the various links and members forming the computer are such that if displacement of pin 23 is proportional to X, then the angular displacement of member 21 about pin B will be proportional to the expression $$\frac{1}{(1+.0402X)^2}$$

which may be represented by the term Y. Positioned beneath member 21 and in cooperation therewith is a uniformly calibrated arcuate scale 32 for indicating values of Y. As shown in Fig. 1, for a setting of pin 23 adjacent the X=0 position on scale 30, the pointer at the extremity of member 21 is adjacent the Y=1 calibration on scale 32 in accordance with the aforementioned formula and the curve of Fig. 2. Similarly, if the pin 23 were set at X=10, the index of member 21 would fall at the point on scale 32 where Y equals approximately .5 in accordance with the curve of Fig. 2. Otherwise stated, the relative dimensions of the device are such that if X represents the displacement of the input section of the computer from the zero position, then the angular displacement of the output section of the device or Y is represented by the expression $$Y = \frac{1}{(1+.0402X)^2}$$

In order that the above relationship may be true, the relative dimensions of the device stated in terms of unity (1) as a basis of measurement are as follows:

| | |
|---|---|
| Horizontal distance from pivot point A to pivot point B | 1.0000 |
| Vertical distance from pivot point A to pivot point B | 0.000 |
| Length of member 20 from pivot point A to pivot point C | 1.1080 |
| Length of member 20 from pivot point A to pivot point E | .2500 |
| Angle included between lines AC and AE of member 20 | 107° |
| Length of member 21 | .5010 |
| Length of member 22 | 1.0000 |
| Length of member 25 | 1.9404 |

The device may be considered to consist of an input section and an output section, the input being represented by links 22 and that portion of member 20 extending from pivot point A to point E, and the output section being represented by that portion of member 20 extending from point A to point C, link 21 and link 25. In the operation of the device, if the displacement of pin 23 from the zero point is proportional to X, then the angular displacement of link 21 about pivot point B will be proportional to $$\frac{1}{(1+.0402X)^2}$$

which may be defined as Y. The position of pin 23 in the figure corresponds to the X=0 position. The displacement of this pin to the right for a given value of X is .11245 times the value of X multiplied by the dimensional unit for the input section. It has heretofore been stated that the output angle is proportional to Y. The actual expression for the output angle is .13731° times the quantity (825−Y). It is noted that the operating range of member 20, that is the input range, and the operating range of member 21, that is the output range, for best precision with this mechanism is 90°.

Although member 20 has been illustrated as a single curved member, it will readily be understood that this member may easily be replaced by a pair of links of dimensions A—C and A—E, fixedly joined together at an angle of 107°.

The curve of Fig. 3 indicates the theoretical precision of the present linkage over the range of operation thereof as determined by the curve of Fig. 2. The abscissas of the curve show the class B error of the mechanism in terms of units of Y and in percentage. Class B error is that defined as inherent in the linkage by reason of lengths of elements used, orientation, etc., and does not include error due to backlash between elements and such mechanical errors. It will be noted that except for small portions of the operating range when the values of X are small, the error of the linkage does not exceed more than approximately .75% of the value of $f(X)$ over about 97% of the operating range.

While this computer has been disclosed and described as a computer independent of any associated mechanism, the computer has found particularly useful application in connection with gun training systems and ballistics computing apparatus in which it has been found to be necessary to develop a movement proportional to the expression $$\frac{1}{(1+.0402X)^2}$$

where X is the displacement of one member of such apparatus.

While a particular embodiment of my invention has been disclosed and described, it is to be understood that various changes and modifications may be made therein without departing from the spirit and scope of the following claims.

What is claimed is:

1. A mechanical computer for computing the expression $$Y = \frac{1}{(1+.0402X)^2}$$

comprising a support, a first swinging member pivoted to said support, a second swinging member pivoted to said support, a slide member slidably mounted on said support, a first link operatively connecting one end of said second swinging member and said slide member, and a second link operatively connecting said first and second swinging members, said links and swinging members having the following relative dimensions where the basis of measurement is taken as unity (1):

| | |
|---|---|
| Length of first swinging member | .5010 |
| Length of second swinging member from the pivot point thereof to one end | .2500 |
| Length of second swing member from the pivot point to the opposite end | 1.1080 |
| Angle included lines connecting the pivot point of said second swinging member and the opposite ends thereof | 107° |
| Length of said first link | 1.000 |
| Length of said second link | 1.9404 | the pivot points of said swinging members being so disposed with respect to each other that angular displacement of said first swinging member is proportional to $$\frac{1}{(1+.0402X)^2}$$

where X represents the displacement of said slide member from the zero position thereof.

2. A linkage mechanism for computing the empirical function $$Y = \frac{1}{(1+.0402X)^2}$$

where X is an independent input variable in seconds and Y is the output of said mechanisms measured in units, said mechanism comprising, a support having a longitudinal axis and a slideway therein in coincidence with said axis, a slidable pin mounted for reciprocal movement in said slideway for introducing values of X into said mechanism, a swinging member pivotally attached at one end to said support and being located on said axis, a bell-crank shaped swinging member pivotally attached at its knee to said support and located on said axis, a first link operatively connecting said slidable pin and a first unpivoted end of said bell-crank, and a second link operatively connecting the second unpivoted end of said bell-crank and the unpivoted end of said swinging member, said links and swinging members having the following relative dismensions and orientations where the basis of comparison is taken as unity:

Length of said swinging member ........ .5010
Length of said bell-crank from the knee thereof to the said first unpivoted end thereof ............................. .2500
Length of said bell-crank from the knee thereof to the said second unpivoted end thereof ........................... 1.1080
Angle included between lines drawn from the knee of said bell-crank to the said first and second unpivoted ends thereof .. 107°
Length of said first link ................ 1.000
Length of said second link .............. 1.9404
Distance along said axis between the pivot points of said bell-crank and said swinging member .......................... 1.000
Distance along said axis between the pivot point of said bell-crank and the position of said slidable pin, where the value of X = 0 ............................... .7849
Angle measured clockwise between a line joining the pivot point and the said second unpivoted end of said bell-crank, and said axis, where the value of X = 0 ............................. 108.00°
Angle measured clockwise between said axis and a line joining the pivot point and the unpivoted end of said swinging member when X = 0 (and Y = 1) ..... 147.36° the aforementioned dimensions and orientation providing that the angular displacement of said swinging member is proportional to the displacement of said slidable pin from the X = 0 position thereof in accordance with the expression $$Y = \frac{1}{(1+.0402X)^2}$$

ANTONIN SVOBODA.

REFERENCES CITED

The following references are of record in the file of this patent:

UNITED STATES PATENTS

| Number | Name | Date |
|---|---|---|
| 2,394,180 | Imm | Feb. 5, 1946 |

FOREIGN PATENTS

| Number | Country | Date |
|---|---|---|
| 113,136 | Great Britain | Feb. 7, 1918 |